March 29, 1960      A. L. HUBBARD      2,930,177

COTTON PICKING UNIT WITH CLEANING AND SEPARATING MEANS

Filed Aug. 28, 1956      4 Sheets-Sheet 1

INVENTOR.
A.L. HUBBARD

ATTORNEYS

March 29, 1960 — A. L. HUBBARD — 2,930,177
COTTON PICKING UNIT WITH CLEANING AND SEPARATING MEANS
Filed Aug. 28, 1956 — 4 Sheets-Sheet 2

INVENTOR.
A. L. HUBBARD

ATTORNEYS

March 29, 1960   A. L. HUBBARD   2,930,177
COTTON PICKING UNIT WITH CLEANING AND SEPARATING MEANS
Filed Aug. 28, 1956   4 Sheets-Sheet 3

INVENTOR.
A.L. HUBBARD

ATTORNEYS

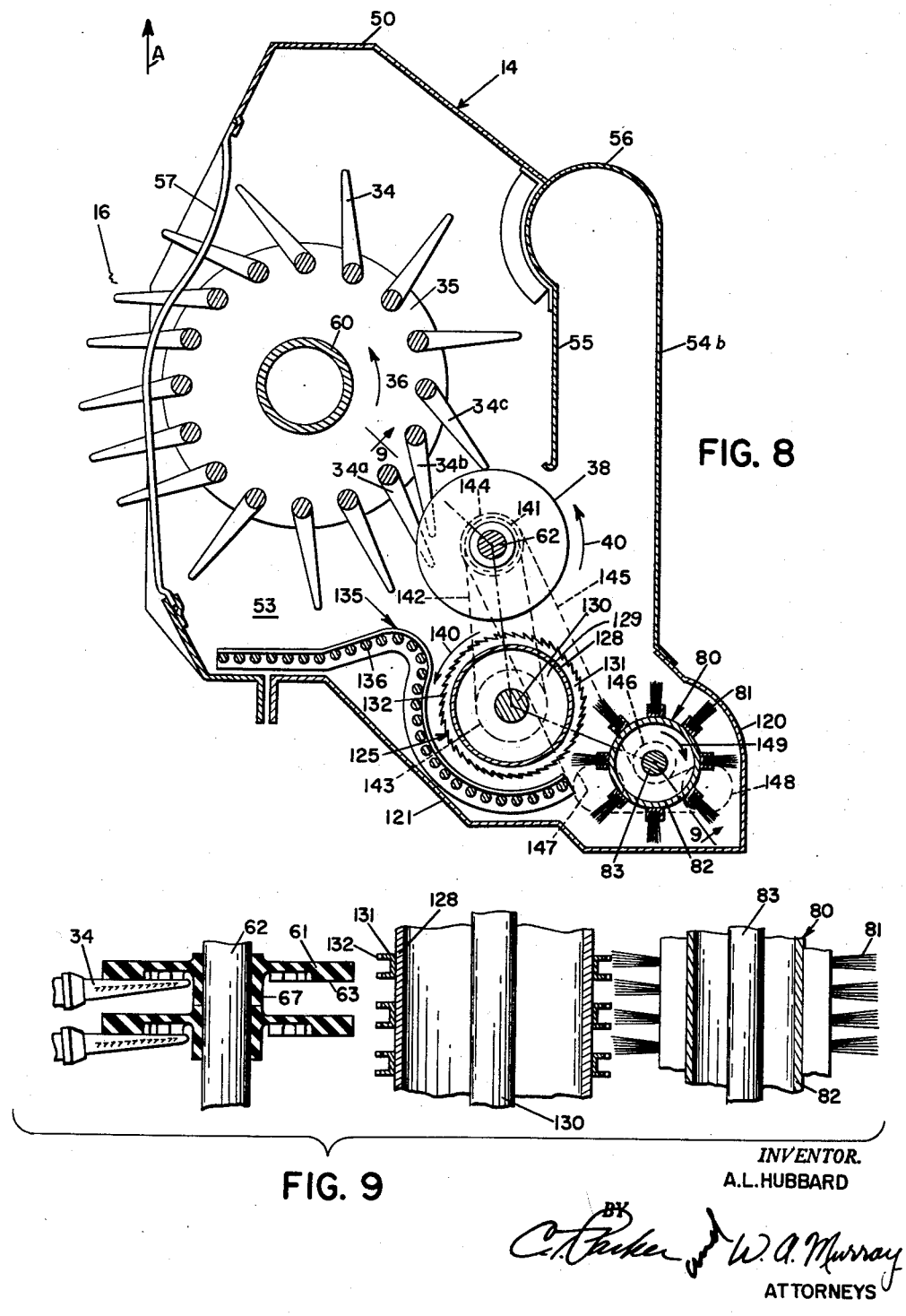

United States Patent Office 2,930,177
Patented Mar. 29, 1960

2,930,177

COTTON PICKING UNIT WITH CLEANING AND SEPARATING MEANS

Arthur L. Hubbard, Des Moines, Iowa, assignor, by mesne assignments, to Deere & Company, a corporation of Delaware Application August 28, 1956, Serial No. 606,754

17 Claims. (Cl. 56—41)

This invention relates to a cotton harvester and more particularly to the picking mechanism incorporated in the harvester.

A representative cotton picker of the general class referred to is disclosed in U.S. patent to Paradise 2,660,852 wherein it will be seen that the picking machine operates over a field in which the cotton is planted in rows, the machine having one or more picking units for picking from one or more rows. Each picking unit includes picking spindles that are barbed and rotated to pull the cotton from the ripened bolls as the machine advances, the spindles being arranged in a drum which rotates as a unit to carry the spindles through the plants then back to the doffing mechanism from which the cotton is doffed for ultimate transfer to a basket or receptacle by pneumatic conveying means. The primary characteristic of this type of harvester is that the spindles collect only the ripened cotton bolls, this being in contrast to other types of harvesters in which all cotton bolls, both ripe and green, are harvested. Accordingly, this type of harvester therefore provides a higher grade of picked cotton which ultimately demands a higher market price.

According to the present invention, it is a feature to provide a picking mechanism in the harvester which will ultimately increase the quality or grade of cotton transferred to the basket or receptacle. Specifically this will be done by providing a vertically disposed grille structure within the picking unit housing which will take advantage of the centrifugal action of both the spindles and doffing mechanism by permitting a portion of the incidental trash collected on the cotton bolls to be driven centrifugally through the grille structure while restricting the cotton bolls. Consequently, the trash having been removed, the cotton bolls will have a higher grade or quality.

It is also a feature or an object of the present invention to incorporate in the above picking unit a cooperating cleaning or agitating unit which receives the cotton bolls from the doffing mechanism in a semi-clean or trash-infected condition and to create a vigorous cleaning action among the bolls prior to transferring the bolls to the pneumatic conveying means of the harvester.

Other features and objects of the invention will become apparent to those familiar with the art as the invention is better understood from the following detailed description as represented in the accompanying drawings.

Fig. 8 is a view similar to Fig. 3 showing a further modification of the invention.

Fig. 9 is an enlarged sectional view taken along the line 9—9 of Fig. 8.

Figure 1:
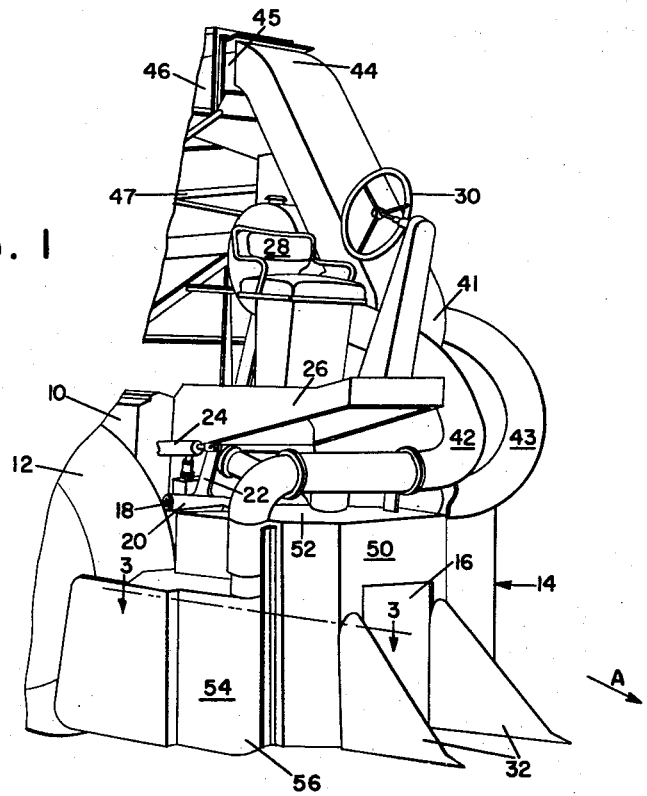
Fig. 1 is a perspective view of a front and right side portion of a typical cotton harvester which incorporates the principles of the present invention.

The picking machine chosen for purposes of illustration comprises a supporting frame or body 10 carried for advance over a field in the direction of the arrow A by appropriate ground engaging wheels, a portion of one of which is visible at 12. The frame or body carries forwardly thereof a picking mechanism housing structure 14 having a fore-and-aft picking passageway or throat 16 in which the row planted cotton is received as the machine advances. The supporting structure for the housing structure 14 may be of any nature, that shown comprising a transverse rockshaft 18 mounted on the body 10 and including one or more housing-supporting arms, such as that shown at 20, plus at least one upright arm 22 to which is connected a counterbalancing spring 24. These details are largely immaterial but are disclosed merely for the purposes of orientation.

The body 10 carries a forwardly positioned operator's station 26 on which are supported a seat 28 and a steering wheel 30 for guiding the machine. Cotton plants are guided into the throat or passageway 16 by dividers or plant lifters 32. Here again, the structure is only representative of conventional design.

Figure 2:
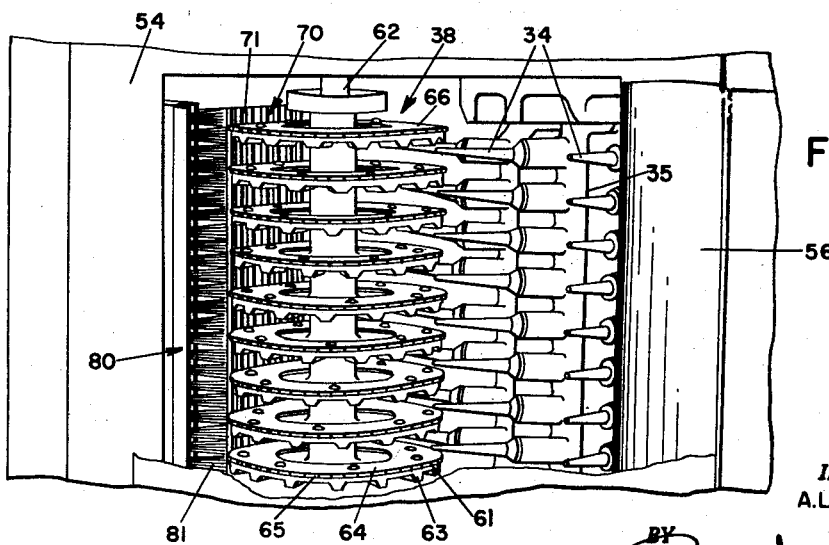
Fig. 2 is an enlarged front and side perspective of a portion of the picking unit with parts of the unit housing removed to show the picking and cleaning mechanism.

Cotton entering the picker housing 14 via the throat 16 is removed from the plants by picking mechanism similar to the type shown in the above-mentioned Paradise patent. As seen there, and as familiar with those versed in the art, such picking mechanism includes a plurality of barbed spindles 34. A portion of the housing 14 is removed in Fig. 2 to show the general positions of the spindles 34 and a drum 35 on which the spindles are carried. The drum rotates in the direction of the arrow 36 and after passing through the picking zone in the throat 16 passes through a doffing zone, the doffing zone involving rotating doffer means 38, later to be described in more detail, for rotation in the direction of the arrow 40. To this point the general nature of the picking unit is conventional, and details may be obtained in the above mentioned Paradise patent.

The system for moving the picked cotton bolls from the housing 14 comprises a fan housing 41 within which is a rotary fan (not shown). The inlet to the fan housing 41 is established by a pair of flexible conduits 42 and 43, the conduit 42 leading to the housing on one side of the passageway 16 and the conduit 43 leading to the housing on the opposite side. The fan housing 41 has a discharge or outlet 44 that is directed through an opening 45 in the front part of a receptacle or basket 46 mounted on the body 10. The numeral 47 designates the receptacle framework or supporting structure for the basket.

Details of the present invention shall be limited only to that incorporated in the picking mechanism to the right of the passage 16. It is felt that the provision of a similar picking mechanism to the left of the passageway would be obvious to those skilled in the art of cotton harvesters and that further description pertaining to that mechanism would be surplusage as concerns the present invention.

The housing structure 14 at the right of the passageway 16 is composed of upright panels 50, 51 at the front and rear interconnected at their upper and lower edges by an upper horizontally disposed panel 52 and a lower horizontally disposed panel 53. The right side of the housing is formed by a pair of upright fore-and-aft extending panels 54, 55 which form a channel for the cotton bolls following the picking operation and which has an opening at its upper forward end to receive the intake end of the flexible conduit 42. A forward end panel 56, integral with the panels 54 and 55, is curved to form a symmetrical continuation of the conduit 42. The left side of the housing or the side adjacent to the passage 16 is formed by a series of horizontal and vertically spaced grid bars 57 which provide fore-and-aft extending slots to permit the spindles 34 to extend into the passage 16. The exact contour or details of the housing structure 14 is unimportant for purposes of this invention other than to disclose that it is sufficient to inclose all the operating mechanism of the picking unit.

Figure 3:
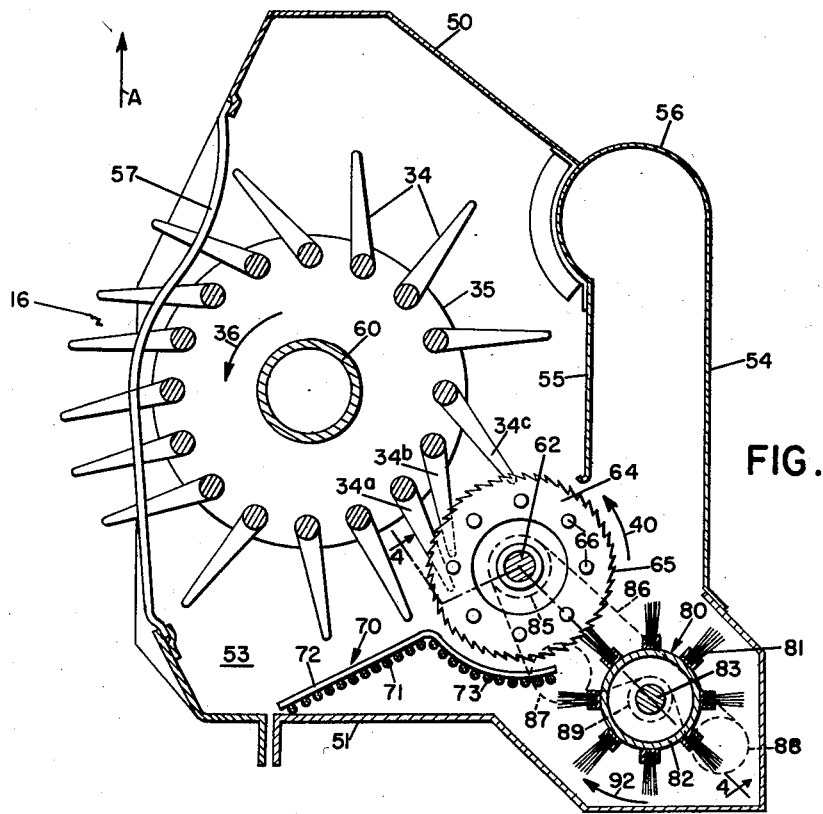
Fig. 3 is a sectional view taken substantially along the lines 3—3 of Fig. 1. For purposes of simplicity and clarity, the picking drum and spindle assembly is shown only in representative form.
Figure 4:
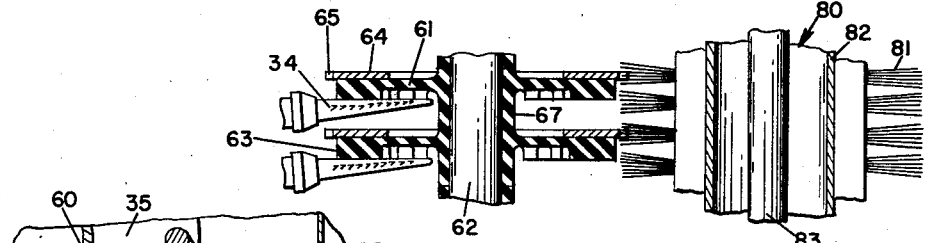
Fig. 4 is an enlarged sectional view taken substantially along the line 4—4 of Fig. 3.

In the first form of the invention as shown in Figs. 3-4 the picking mechanism includes the picker drum 35 which is supported by the housing structure 14 by means of a vertically disposed tube or shaft 60 mounted to rotate about an upright axis and in the direction as previously mentioned as indicated by the arrow 36. As shown in Fig. 3 the spindles 34 operate to successively move into the passage 16 to collect a commingled mixture of cotton bolls and incidental trash from the cotton plants passing through the harvester as it moves over the field. The operation of the spindles 34 is more or less conventional, each spindle being provided with a series or row of barbs on their outer surface and rotating about its own axis as the drum 35 rotates about the upright axis. The spindles, as they move into the passage, will tend to snag or grip the ripe cotton bolls thereby dislodging the bolls from the plant. The picked cotton bolls are then moved inwardly of the housing 14 by the rotating motion of the drum 35.

The doffing structure is composed of a series of vertically spaced doffing plates 61 which are mounted on a vertical shaft 62 also supported in the housing structure 14. The doffer plates 61 have a series of downwardly extending integral lugs 63 at their outer edges which provide a bottom surface for contacting the spindles 34 and through proper positioning of the spindles relative to the doffer plates, the cotton bolls will be removed cleanly from the barbs on the spindles. Typical of such positioning is shown by the spindles 34a, 34b, and 34c (Fig. 3). The doffer plates 61 are constructed of a hard rubber or fibrous material and each doffer has a hub portion 67 mounting the doffer plate on the shaft 62 and which operates to space the plates 61 vertically on the order of the spacing of the spindles 34. Therefore, for each row of spindles 34 there is a cooperating and corresponding doffer plate 61.

Fixed to the upper surface of each doffer plate 61 is an annular member or ring 64 having at its outer periphery a row of saw teeth 65. The ring 64 is fixed to the doffer plates 61 by means of rivets 66. It should here be noted that the annular rings 64 are spaced vertically from the spindles 34 substantially the distance or thickness of the doffing plates 61. As clearly shown in Fig. 4 the rings 64 do not therefore act as doffing elements other than incidentally.

In the rear of the housing structure 14 and also suitably supported by the structure 14 is a vertically disposed grille structure 70 composed of a series of vertically disposed rods 71. A portion 72 of the framework 70 is positioned at the rear of the spindle drum 35 and an arcuate portion 73 circumscribes the rear portion of the doffers 61 and annular members 64.

At the extreme rear of the picking mechanism and at the outer side thereof is a vertically disposed rotating brush structure 80. The structure consists of a series of angularly spaced brush elements 81 which are fixed to a suitable carrier as 82, the carrier 82 including a vertically disposed shaft 83. The brushes 81 extend radially relative to the shaft 83 and as shown clearly in Fig. 3 are in a position to contact the saw teeth 65 of the annular rings 64.

Drive mechanism to operate the picking mechanism is similar to that shown in the Paradise patent as pertains to the spindle drum 35 and the doffing mechanism 38. As previously mentioned the spindle drum rotates in the direction of the arrow 36 and the doffer means operates in the direction of the arrow 40. Provided on the shaft 62 is a sprocket 85 indicated in dotted representation. A chain 86 fits over the sprocket 85 and operates to drive a sprocket 89 on the shaft 83, both the sprocket and chain also being indicated in dotted representation. A reverse bend is created in the chain 86 by means of a pair of idler sprockets 87, 88. The exact details of the drive are unimportant other than to provide a drive that will rotate the brush structure in the direction of the arrow 92 and at a greater peripheral speed than the ring members 64.

In the first form of the invention the picking mechanism operates in the following manner. The spindles 34 operate to pick the ripe cotton bolls from the plants passing through the passageway 16 and while in the process of picking also draws into the housing 14 an amount of incidental trash such as leaves, portions of the plant and other foreign matter in the field. The centrifugal action created by the spindle unit as it rotates will cause part of the foreign matter on the picked cotton bolls to depart from the spindle area upon initial movement within the housing 14 and be directed substantially in the direction of the grille portion 72. The spaced apart vertical rods 71 will permit the trash to pass through the grille and drop to the lower portion of the housing eventually to gravitate to the ground. The spindles 34 will move between the doffer plates 61 with the obvious purpose of removing or doffing the cotton bolls and the remaining incidental trash connected or fixed to the cotton bolls from the spindles 34. Centrifugal action of the doffers 61 will cause the cotton bolls to be driven outwardly to the periphery of the plates whereupon the bolls will move vertically either by gravity or by air currents within the housing and come into contact with the teeth 65 on the rings or annular members 64. The teeth 65 will snag or grip the cotton bolls and drag them across the rods or bars 71 of the arcuate portion 73. The rods 71 will pass the trash between them and the cotton bolls will stay attached to the teeth 65.

Noticing for the moment the relative sizes of the sprocket 85 and 89 it becomes apparent that the brushes 81 rotate at a considerably greater speed than the doffing structure 38. Consequently, as the portion of the teeth 65 come into contact with the brushes 81, the bolls will be stripped from the teeth and driven in the direction of the forward panel 56, where the blower 41 will act through the conduits 42 to draw the then cleaned cotton bolls upwardly, ultimately to be discharged in the basket 46.

Figure 5:
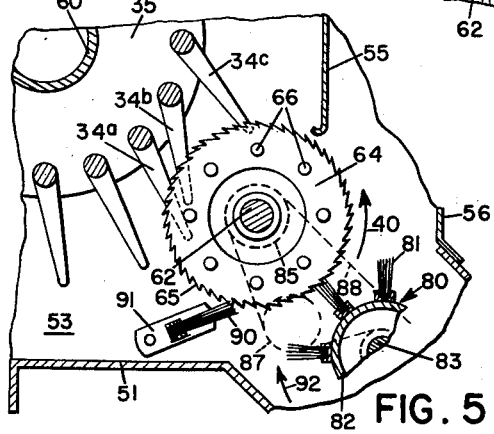
Fig. 5 is a view similar to Fig. 3 but showing a modification of the present invention.

Referring next to the second form of the invention as shown specifically in Fig. 5, the trash separating mechanism or structure is in the form of a vertically disposed and fixed brush 90 which is so positioned so as to have its bristles engaging the outer tips of the annular saw blades 64. The brush 90 is substantially the length of the doffer structure and is fixed to the upper and lower panels 52, 53 by means of plate brackets, as at 91. This form of the invention operates in a manner similar to that shown in Figs. 1-4 with the exception that the brush 90 operates to comb the incidental trash from the cotton bolls as the saw blades 64 pass the bolls through the end of the bristles. Consequently, the brush 90 serves as a replacement for the grille 71 in this form of the invention.

Figures 6, 7:
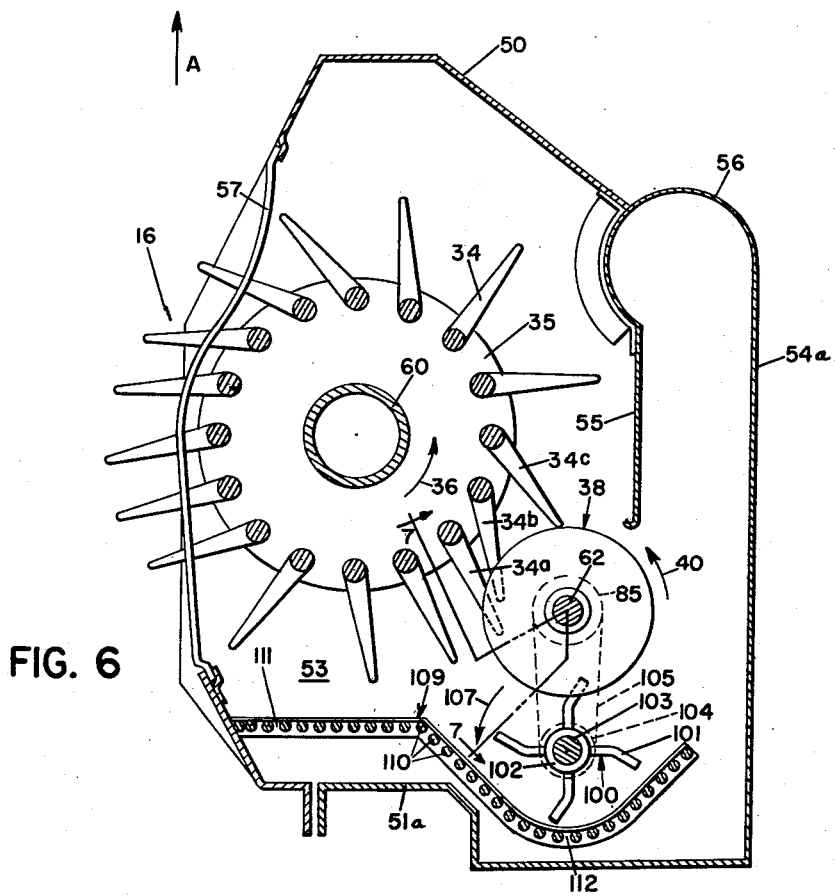
Fig. 6 is a view similar to Fig. 3 showing a further modification of the invention.
Fig. 7 is an enlarged sectional view taken along the lines 7—7 of Fig. 6.

In the form of the invention shown in Figs. 6 and 7 the picking drum spindle 35 and the spindles 34 are similar in type and in operation to those described in the previous forms of the invention. The housing structure is substantially identical to that previously shown with the exception that variations, such as the side plate 54a and rear plate 51a, are made in its shape so as to fully enclose and conform to the outline of the picking mechanism. Consequently similar reference numerals will be used to identify similar parts or parts substantially similar to that of the previous form. The doffer plates 61 are also identical in their operation and in regard to their mounting on their carrier or shaft 62. However, in this latter form of the invention the upper surface of the plates 61 do not carry the ring or saw member 65 as in the previous form.

To the rear of the doffing mechanism 38 are a series of vertically spaced rotating elements in the form of kicker wheels 100 which are vertically spaced apart on the order of the vertical spacing of the doffing wheels 61. As shown in Fig. 7 the legs or radial extending pins 101 of the kicker wheels 100 extend into an area between the doffing wheels. Hubs 102 of the kicker wheels are affixed to an upright shaft 103 which is suitably journaled in the housing structure 14 and is driven by a chain and sprocket drive comprising the doffer sprocket 85, chain 105, and kicker wheel sprocket 104. Since the kicker wheel structure is driven from the doffer shaft 62 the wheels 100 will rotate in the direction of the arrows 107. Again for purposes of simplicity the drive from the doffer to the kicker wheels 100 is shown in dotted representation.

At the rear portion of the housing 14 is a vertically disposed grille structure 109 which extends substantially the width of the housing structure. The grille structure is composed of a plurality of rods 110 spaced apart so as to permit trash to pass between them. The structure 109 has a portion 111 which is positioned substantially to the rear of the spindle drum and operates to pass trash which is moving centrifugally off of the drum 35 and spindles 34. To the rear of the kicker wheels 100 is a second section 112 of the structure 109 which is arcuately shaped to fit around the wheels 100. The rods 110 extend substantially the heighth of the housing and are fixed in any suitable manner to the upper and lower plates 52, 53.

In operation a mixture of cotton bolls and incidental trash accummulated with the cotton bolls are drawn into the picking mechanism by the spindles 34 in the usual manner. The doffer plates 61 again operate to remove the cotton bolls from the spindles 34 and through the rotating motion of the doffer wheels tend to throw the bolls and incidental trash in the direction of the grille structure 109. Agitation of the cotton bolls and incidental trash occurs due to the action of the kicker wheels 100 on the mixture following their leaving the doffer wheels 61. The kicker wheels 100 further operate to convey the mixture of bolls and trash around and proximate to the section 112 of the grille structure 109. The agitation and the movement of the bolls will cause the trash to pass between the rods 110 of that section. Following the cleaning operation the cotton bolls will then be directed by the kicker wheels 100 forwardly toward the forward section 56 of the housing structure 14 there to be withdrawn from the housing by the suction created by the fan in the conduit 42, eventually to be discharged into the basket 46.

In the final form of the invention as shown in Figs. 8 and 9 similar parts to those shown in the other forms of the invention are given identical reference numbers. A side panel 54b of the housing structure 14 is flared outwardly as at 120 to connect to a rear panel 121. The remainder of the housing structure is identical to that of the previous form. The spindles 34 and spindle drum structure are also identical and likewise the doffing mechanism 38. To the rear of the doffing structure 38 is a rotatable toothed structure 125. The toothed structure 125 is composed of an upright cylindrical drum 128 enclosed at its lower end by a plate 129 and at its upper end by a similar plate, not shown. The drum 128 is fixed to a vertically disposed shaft 130 which in turn is journaled in the housing structure 14. Annular members 131 are fixed to the outer periphery of the cylinder 128 and are spaced vertically apart. The members or rings 131 are substantially of a U-shaped cross section providing a pair of radially extending legs on each ring. Each of the legs are provided with a toothed outer edge as at 132. A cooperating rotating element in the form of a vertically disposed brush is mounted adjacent to the toothed structure 125. The cooperating rotating structure is in the form of a brush structure which is identical to that shown in Fig. 3 and described in reference to that form of the invention and consequently the same reference numerals are applied to it. Further description of the brush structure may be dispensed with other than to say that the outer bristle end of the brushes 81 engage the outer peripheral toothed portion 132 of the rotating element 125.

An upright grille structure 135 is provided to the rear of the spindle drum 35 and the toothed structure 125. The grille structure 135 is composed of a series of vertical rods 136 spaced apart so as to permit trash to pass through. The toothed structure 125 is rotated in the direction of the arrow 140 by means of a drive mechanism driven from the doffer shaft 62 and composed of a doffer sprocket 141, a chain 142, and a sprocket 143 fixed to the shaft 130. Again the drive is shown in dotted representation for simplicity. The brush structure 80 is driven from the doffer shaft 62 by means of a sprocket 144, a chain 145 and a sprocket 146 fixed to the brush structure 80. Idler sprockets 147, 148 are provided to create a back bend in the chain 145 so as to reverse the direction of travel of the brush element relative to the shaft 62 and in the direction of the arrow 149.

In the latter form of the invention the picking and doffing mechanism operates in a manner similar to that previously described. The doffing structure 38 discharges the cotton bolls and incidental trash centrifugally toward the toothed structure 125 where the teeth 132 snag or grip the cotton bolls and drag them over the rods 136 to cause the incidental trash to pass between the rods. The brush structure 80 will rotate at a higher rate of speed than the toothed structure 125 and will therefore tend to brush the cotton bolls from the teeth 132 and to drive them toward the front of the housing and in the direction of the panel 156 where the suction from the blower will draw them upwardly to eventually be discharged in the basket 46.

In a manner similar to the previous forms of the invention the part of the grille structure 135 to the rear of the spindles 35 operates to permit trash being thrown centrifugally from the drum 35 to pass between the rods 136 while retaining the cotton bolls within the main housing structure.

While only four modifications of the present invention have been shown it should be recognized that other forms and variations could undoubtedly occur in the minds of those familiar with the basic art. It should therefore be understood that the embodiments of the invention herein disclosed have been so disclosed with the view of clearly and concisely illustrating the broad general principles of the invention. It is therefore not the desired purpose to limit or narrow the invention to the exact embodiments herein disclosed but to the invention as herein claimed.

What is claimed is:

1. In a cotton harvester movable over a field of cotton plants, housing structure providing a passage for successively passing earth borne cotton plants through the harvester; a picker drum mounted in the housing structure for rotation on an upright axis including vertically spaced apart and radially extending spindle members operative to successively move into the passage to collect a commingled mixture of cotton bolls and incidental trash from the plants and to carry the mixture inwardly of the housing structure; a doffing structure supported by the housing structure rotatable about an upright axis and operative to remove the commingled mixture from the spindles; an upright trash separating structure supported by the housing structure; and rotatable elements supported by the housing structure having means thereon for collecting the commingled mixture as it is removed from the spindles and drawing it across the trash separating structure for effecting separation of the trash from the cotton bolls.

2. The invention defined in claim 1, in which the doffer structure includes a series of vertically spaced apart doffer plates mounted on a carrier rotatable about an upright axis and having axially spaced doffing faces and outer peripheral edges; and the rotatable elements are in the form of annular members fixed to the doffer plates and having saw-toothed peripheries extending radially beyond the peripheries of the associated plates.

3. The invention defined in claim 2, in which the trash separating structure is a vertically disposed pervious section supported in the housing structure which permits the trash to pass through as the commingled bolls and trash are driven past.

4. The invention defined in claim 1 in which the trash separating structure includes a vertically disposed brush fixed to the housing structure and having its free bristle end projecting proximate to the rotatable elements for causing the trash to be combed from the bolls as the elements move the bolls past the brush.

5. The invention defined in claim 1, in which the rotatable elements are vertically spaced apart circular members rotatable about a vertical axis with each member having an annular row of teeth adapted to snag the bolls, and the rotatable elements further include a cooperating vertical rotating brush adapted to brush the bolls from the teeth following the separation of the trash from the bolls.

6. The invention defined in claim 1, in which the rotatable elements are kicker wheels rotatable about an upright axis having radially projecting pins and operative upon rotation to drive the mixture of cotton bolls and trash over the separating means.

7. In a cotton harvester movable over a field of cotton plants, housing structure including therein a vertically disposed pervious section and providing a passage for successively passing earthborne cotton plants through the harvester; a picker drum mounted in the housing structure for rotation on an upright axis including vertically spaced apart and radially extending spindle members operative to successively move into the passage to collect a commingled mixture of cotton bolls and incidental trash from the plants and to carry the mixture inwardly of the housing structure; a doffing structure supported by the housing structure rotatable about an upright axis and comprising doffer plates spaced vertically on the order of the vertical spacing of the spindles and having doffing faces and outer peripheral edges, the doffer plates being operative to remove the commingled mixture from the spindles; annular members fixed to the doffer plates having toothed peripheries extending radially outward of the peripheries of the associated plates adapted to snag the cotton bolls doffed from the spindles and to draw them across the pervious section to cause the trash to pass through the section thereby separating the trash from the cotton bolls.

8. In a cotton harvester movable over a field of cotton plants, housing structure including therein a vertically disposed pervious section providing a passage for successively passing earth borne cotton plants through the harvester; a picker drum mounted in the housing structure for rotation on an upright axis including vertically spaced apart and radially extending spindle members operative to successively move into the passage to collect a commingled mixture of cotton bolls and incidental trash from the plants and to carry the mixture inwardly of the housing structure; a doffing structure supported by the housing structure rotatable about an upright axis and comprising doffer plates spaced vertically on the order of the vertical spacing of the spindles and having doffing faces and outer peripheral edges, the doffer plates being operative to remove the commingled mixture from the spindles; annular members fixed to the doffer plates having toothed peripheries extending radially outward of the peripheries of the associated plates and adapted to snag the cotton bolls doffed from the spindles and to draw them across the pervious section to cause the trash to pass through the section thereby separating the trash from the cotton bolls; and a vertically disposed rotating brush supported in the housing structure and adapted to brush the bolls from the teeth of the annular members following separation of the trash from the bolls.

9. In a cotton harvester movable over a field of cotton plants, housing structure providing a passage for successively passing earth borne cotton plants through the harvester; a picker drum mounted in the housing structure for rotation on an upright axis including vertically spaced apart and radially extending spindle members operative to successively move into the passage to collect a commingled mixture of cotton bolls and incidental trash from the plants and to carry the mixture inwardly of the housing structure; a doffing structure inwardly of the housing structure rotatable about an upright axis and comprising doffer plates spaced vertically on the order of the vertical spacing of the spindles and having doffing faces and outer peripheral edges, the doffer plates being operative to remove the commingled mixture from the spindles; annular members fixed to the doffer plates having toothed peripheries extending radially outward of the peripheries of the associated plates adapted to snag the cotton bolls doffed from the spindles; a vertically disposed rotating brush supported in the housing structure and adapted to brush the bolls from the teeth of the annular members following separation of the trash from the bolls; and a vertically disposed brush fixed to the housing structure and having its bristle portion positioned proximate to the toothed periphery for combing the trash from the cotton bolls as they pass proximate thereto.

10. In a cotton harvester movable over a field of cotton plants, housing structure including therein a vertically disposed pervious section and providing a passage for successively passing earth borne cotton plants through the harvester; a picker drum mounted in the housing structure for rotation on an upright axis including vertically spaced apart and radially extending spindle members operative to successively move into the passage to collect a commingled mixture of cotton bolls and incidental trash from the plants and to carry the mixture inwardly of the housing structure; a doffing structure supported by the housing structure rotatable about an upright axis and comprising doffer plates spaced vertically on the order of the vertical spacing of the spindles having doffing faces and outer peripheral edges, the doffer plates being operative to remove the commingled mixture from the spindles; vertically spaced pin wheels rotatable about an upright axis and having radially extending pins projecting into the spacing between the doffer plates and collecting the commingled mixture as it is doffed from the spindles and driving it against the pervious section of the housing structure to effect passage of the trash through the section thereby separating the trash from the cotton bolls; and means mounting the pin wheels in said housing structure.

11. In a cotton harvester movable over a field of cotton plants, housing structure including therein a vertically disposed grille section providing a passage for successively passing earth borne cotton plants through the harvester; a picker drum mounted in the housing structure for rotation about an upright axis including vertically spaced apart and radially extending spindle members operative to successively move into the passage to collect a commingled mixture of cotton bolls and incidental trash from the plants and to carry the mixture inwardly of the housing structure; a doffing structure supported by the housing structure rotatable about an upright axis and including vertically spaced doffing plates having doffing surfaces operative to remove the commingled mixture from the spindles; an upright support mounted on the housing structure for rotation about an upright axis; and vertically spaced circular elements mounted on the support and having annular rows of teeth for snagging the cotton bolls, said elements being positioned to receive the doffed cotton bolls from the doffing structure and to move them across the grille section to effect passage of the trash through the section thereby separating the trash from the cotton bolls.

12. In a cotton harvester movable over a field of cotton plants, housing structure providing a passage for successively passing earth borne cotton plants through the harvester; a picker drum mounted in the housing structure for rotation on an upright axis including vertically spaced apart and radially extending spindle members operative to successively move into the passage to collect a commingled mixture of cotton bolls and incidental trash from the plants and to carry the mixture supported by the housing structure; a doffing structure inwardly of the housing structure rotatable about an upright axis and including vertically spaced doffing plates having doffing surfaces operative to remove the commingled mixture from the spindles; trash separating means in the housing adjacent the doffing structure; an upright support mounted on the housing structure and rotatable about an upright axis; vertically spaced elements mounted on the support and having radial portions effective to receive the doffed cotton bolls from the doffing structure and to move them adjacent the trash separating means to cause the trash to be separated from the cotton bolls.

13. In a cotton harvester movable over a field of cotton plants, housing structure providing a passage for successively passing earth borne cotton plants through the harvester; a picker drum mounted in the housing structure for rotation on an upright axis including vertically spaced apart and radially extending spindle members operative to successively move into the passage to collect a commingled mixture of cotton bolls and incidental trash from the plants and to carry the mixture inwardly of the housing structure; a doffing structure supported by the housing structure rotatable about an upright axis and operative to remove the commingled mixture from the spindles; and a vertically disposed grille structure supported by the housing structure positioned to intercept cotton bolls and incidental trash moving from the rotating picker drum and doffing structure and pervious to pass the incidental trash while retaining the cotton bolls.

14. The invention defined in claim 13, further characterized by rotatable elements supported in the housing structure having means for collecting the commingled mixture of cotton bolls and trash as it is doffed from the spindles and directing it against the grille structure.

15. In a cotton harvester movable over a field of cotton plants, housing structure providing a passage for successively passing earth borne cotton plants through the harvester; a picker drum mounted in the housing structure for rotation on an upright axis including vertically spaced apart and radially extending spindle members operative to successively move into the passage to collect a commingled mixture of cotton bolls and incidental trash from the plants and to carry the mixture inwardly of the housing structure; a doffing structure inwardly of the housing structure rotatable about an upright axis and operative to remove the commingled mixture from the spindles; and grille structure supported in the housing structure positioned to intercept the cotton bolls and incidental trash moving centrifugally from the doffing structure and picker drum, the grille structure being pervious to pass the incidental trash while retaining the cotton bolls.

16. In a cotton harvester movable forwardly over a field of cotton plants: housing structure defining a fore-and-aft extending passage for successively receiving earth borne cotton plants; a picker drum mounted in the housing structure for rotation on an upright axis including vertically spaced and radially extending spindle members operative to successively move into the passage to collect commingled mixture of cotton bolls and incidental trash from the plants and to carry the mixture inwardly of the housing structure, said drum being operative to move said spindles in an orbit from front to rear in the passage to effect movement of the mixture rearwardly; an upright and transverse grille structure mounted in the housing structure adjacent to and rearwardly of the spindle drum and positioned to intercept cotton bolls and incidental trash leaving the spindles, the grille structure being pervious to pass the incidental trash but effective to prevent passage of the cotton bolls.

17. The invention defined in claim 16 further characterized by rotatable doffing structure mounted on the housing structure to one side of the spindle drum for effecting dislodgement of the bolls and trash from the spindles, and said grille structure extending behind the doffing structure and effective to permit passage of trash being driven from the doffing structure.

References Cited in the file of this patent

UNITED STATES PATENTS

| | | |
|---|---|---|
| 1,078,328 | Appleby | Nov. 11, 1913 |
| 1,668,247 | Morava | May 1, 1928 |
| 1,828,534 | Johnston et al. | Oct. 20, 1931 |
| 2,484,524 | Nisbet | Oct. 11, 1949 |
| 2,692,469 | Smith | Oct. 26, 1954 |
| 2,754,650 | Fergason | July 17, 1956 |

UNITED STATES PATENT OFFICE
CERTIFICATE OF CORRECTION

Patent No. 2,930,177                            March 29, 1960

Arthur L. Hubbard

It is hereby certified that error appears in the printed specification of the above numbered patent requiring correction and that the said Letters Patent should read as corrected below.

Column 9, lines 27 and 28, for "supported by" read -- inwardly of --.

Signed and sealed this 4th day of October 1960.

(SEAL)
Attest:

KARL H. AXLINE
Attesting Officer

ROBERT C. WATSON
Commissioner of Patents